US008719335B2

(12) United States Patent
Venkatesh et al.

(10) Patent No.: US 8,719,335 B2
(45) Date of Patent: May 6, 2014

(54) FRAMEWORK FOR DEVELOPMENT OF INTEGRATION ADAPTERS THAT SURFACE NON-STATIC, TYPE-SAFE SERVICE CONTRACTS TO LOB SYSTEMS

(75) Inventors: Chandramouli Venkatesh, Redmond, WA (US); Artem D. Yegorov, Sunnyvale, CA (US); Ehab Sobhy, Redmond, WA (US); Xing Wu, Redmond, WA (US); Sonu Arora, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1398 days.

(21) Appl. No.: 11/842,538

(22) Filed: Aug. 21, 2007

(65) Prior Publication Data

US 2009/0055202 A1 Feb. 26, 2009

(51) Int. Cl.
*G06Q 99/00* (2006.01)
*H04L 12/24* (2006.01)

(52) U.S. Cl.
CPC ........ *H04L 41/0273* (2013.01); *G06Q 2220/18* (2013.01)
USPC .............. 709/203; 705/59; 717/168; 717/174

(58) Field of Classification Search
USPC ....................... 705/59; 709/203; 717/168, 174
See application file for complete search history.

(56) References Cited

U.S. PATENT DOCUMENTS

| | | | |
|---|---|---|---|
| 6,256,676 B1 | 7/2001 | Taylor et al. | |
| 6,305,009 B1 * | 10/2001 | Goor | 717/116 |
| 6,792,431 B2 | 9/2004 | Tamboli et al. | |
| 7,080,092 B2 | 7/2006 | Upton | |
| 7,089,568 B2 | 8/2006 | Yoshida et al. | |
| 7,111,016 B2 | 9/2006 | Gurevich | |
| 7,152,090 B2 | 12/2006 | Amirisetty et al. | |
| 7,188,345 B2 | 3/2007 | Gilfix et al. | |
| 7,657,898 B2 * | 2/2010 | Sadiq | 719/330 |
| 8,015,301 B2 * | 9/2011 | Carter et al. | 709/229 |
| 8,271,998 B2 * | 9/2012 | Dettori et al. | 719/320 |
| 2003/0037174 A1 | 2/2003 | Lavin et al. | |
| 2003/0061405 A1 | 3/2003 | Fisher et al. | |
| 2004/0148183 A1 * | 7/2004 | Sadiq | 705/1 |
| 2005/0044197 A1 * | 2/2005 | Lai | 709/223 |

(Continued)

OTHER PUBLICATIONS

"Structure-Profit Relationships at the Line of Business and Industry Level", David J. Ravenscraft, The Review of Economics and Statistics, vol. 65, No. 1 (Feb. 1983), pp. 22-31, The MIT Press.*

(Continued)

*Primary Examiner* — James D Nigh
(74) *Attorney, Agent, or Firm* — Nicholas Chen; Kate Drakos; Micky Minhas

(57) ABSTRACT

The claimed subject matter provides a system and/or a method that facilitates integrating two or more applications for secure sharing of data. A line of business (LOB) system can include a portion of metadata associated with a business application. An adapter can employ a dynamic service contract to the LOB system, wherein the service contract is a fluid contract constructed in real time from a portion of metadata selected within the LOB system. Moreover, the adapter can enable a client to access the portion of metadata selected via the service contract.

20 Claims, 10 Drawing Sheets

(56) References Cited

U.S. PATENT DOCUMENTS

| | | | |
|---|---|---|---|
| 2005/0108133 A1* | 5/2005 | Balasubramanian et al. | 705/35 |
| 2005/0228803 A1* | 10/2005 | Farmer et al. | 707/100 |
| 2005/0283478 A1* | 12/2005 | Choi et al. | 707/9 |
| 2006/0059107 A1 | 3/2006 | Elmore et al. | |
| 2007/0061731 A1* | 3/2007 | Dillon et al. | 715/733 |
| 2008/0065690 A1* | 3/2008 | Borgsmidt et al. | 707/103 Y |
| 2008/0077652 A1* | 3/2008 | Grant et al. | 709/203 |
| 2008/0114628 A1* | 5/2008 | Johnson et al. | 705/7 |
| 2008/0189206 A1* | 8/2008 | Choi et al. | 705/39 |
| 2008/0201467 A1* | 8/2008 | Delany et al. | 709/224 |
| 2008/0271008 A1* | 10/2008 | Dettori et al. | 717/168 |
| 2010/0153565 A1* | 6/2010 | Nayak et al. | 709/229 |
| 2010/0162264 A1* | 6/2010 | Allen et al. | 719/313 |

OTHER PUBLICATIONS

Microsoft® Computer Dictionary, Fifth Edition.*
Malloy et al., "Improving the Predictable Assembly of Service-Oriented Architectures", IEEE Software, Mar./Apr. 2006, 4 pages.*
http://www.webopedia.com/TERM/T/type_safe.html.*
Hoeymissen, et al. "A Case Study in Application Integration" http://jeffsutherland.org/oopsla2000/hoeymissen/hoeymissen.htm last viewed May 25, 2007, 5 pages.
Griffel, et al. "Electronic Contracting with COSMOS—How to Establish, Negotiate and Execute Electronic Contracts on the Internet" (1998) ACM, 11 pages.
J2EE Connector Architechture Whit Paper http://java.sun.com/javaee/overview/whitepapers/connector.jsp last viewed May 25, 2007, 2 pages.

* cited by examiner

FRAMEWORK FOR DEVELOPMENT OF INTEGRATION ADAPTERS THAT SURFACE NON-STATIC, TYPE-SAFE SERVICE CONTRACTS TO LOB SYSTEMS

BACKGROUND

The evolution of computers and networking technologies from high-cost, low performance data processing systems to low cost, high-performance communication, problem solving, and entertainment systems has provided a cost-effective and time saving means to lessen the burden of performing every day tasks such as correspondence, bill paying, shopping, budgeting information and gathering, etc. For example, a computing system interfaced to the Internet, by way of wire or wireless technology, can provide a user with a channel for nearly instantaneous access to a wealth of information from a repository of web sites and servers located around the world. Such a system, as well, allows a user to not only gather information, but also to provide information to disparate sources. As such, online data storing and management has become increasingly popular.

Enterprise application integration can be the secure and orchestrated sharing of processes and/or data between applications which were not originally designed for such sharing and/or interaction. Conventionally, a service technology (e.g., web service, etc., which are discussed below) or an integration adapter can be written around an existing Line of Business (LOB) system to enable such applications to participate in integration processes. Specifically, the service technology or the integration adapter can be written around specific application program interfaces (APIs) to enable various applications to be "normalized" for data consumption. These adapters have traditionally achieved this normalization by reducing the target systems to appear as "messaging systems" in order to capture LOB specific aspects in an actual message that can be transferred to a backend system (e.g., a LOB application). Yet, such adapter techniques are extremely unfeasible since exchanging messages cannot handle such high levels of abstraction and semantically rich data.

As mentioned, various service technologies can enable data access in accordance with enterprise application integration. For instance, such technologies can include web services, simple object access protocol (SOAP) used to access web services, web service description language (WSDL) specification to define available methods of a web service, and other similar technologies such as representational state transfer (REST), JavaScript object notation (JSON), and other remote procedure call (RPC) and service contract definition languages. Software developers can leverage these technologies to create service applications useable by consumers and administrators to access data, such as in a platform or framework. Data access can include addition, deletion, modification, viewing, and the like. The service technologies can present a service contract definition that defines one or more methods made available by the service; a remote client can access the definition to initiate a request to the service for data access. Although such web services offer a more "human friendly" programming model and appeal of wide reach and support for several popular web service standard protocols, such services require a static, monolithic service contract declared. These static service contracts are problematic and often impossible in light of the numerous methods available/desired and the ever-changing informational request related to LOB systems.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate creating a dynamic service contract related to a line of business system and/or metadata associated therewith. An adapter can generate a dynamic service contract that enables a client to expose a portion of metadata for consumption in real time. In general, the adapter can allow metadata within a line of business (LOB) system to be viewed, browsed, and/or selected in real time in order to create a service contract, wherein such service contract exposes and/or accesses the selected metadata. The metadata within the LOB system can be any suitable data related to a business application. For example, the business application can be a back end application, an existing business application, a line of business (LOB) application (e.g., accounting, supply chain management, resource planning, etc.), a business activity monitoring (BAM) application, etc.

Furthermore, the adapter can create the service contract in a manner that is consumer driven while enforcing strict typing and error checking. In other aspects of the claimed subject matter, methods are provided that facilitate generating a plurality of dynamic, type safe service contracts specific to numerous clients.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
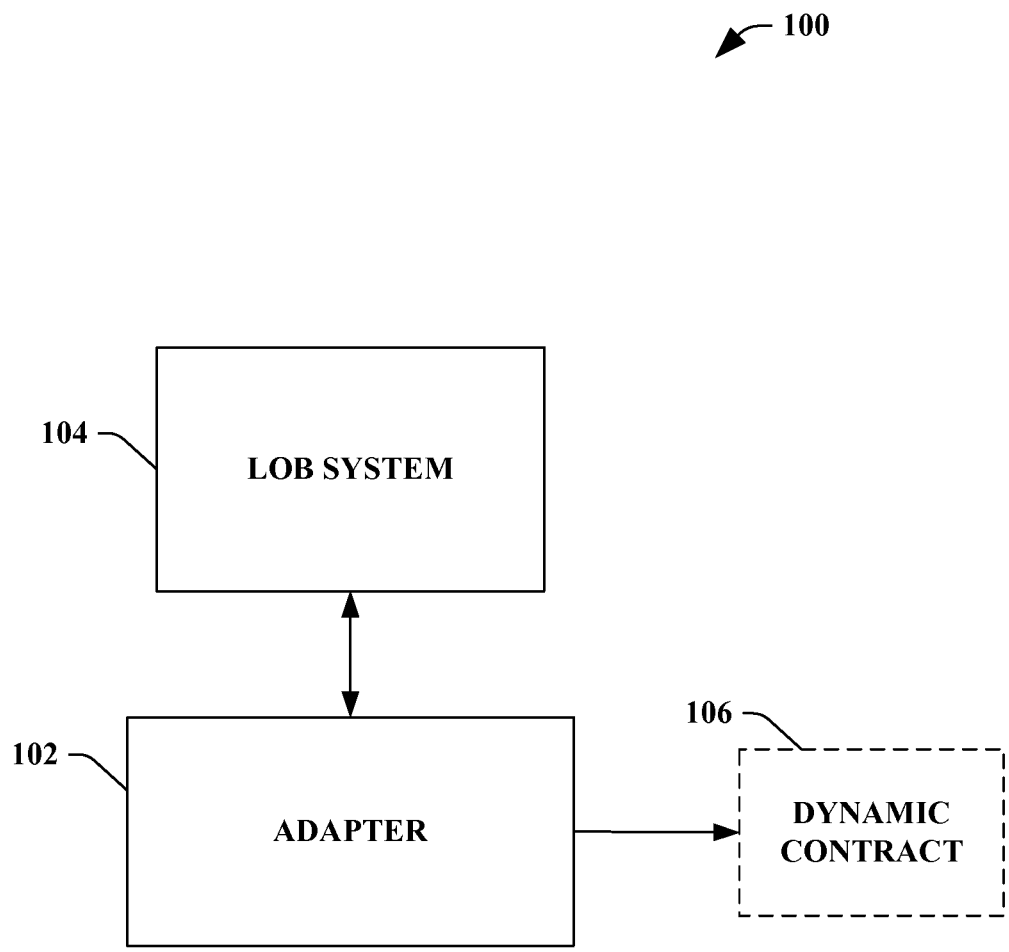
FIG. 1 illustrates a block diagram of an exemplary system that facilitates creating a dynamic service contract related to a line of business system and/or metadata associated therewith.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "handler," "factory," "builder," "extractor," "browser," "reader," "adapter," "writer," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates creating a dynamic service contract related to a line of business system and/or metadata associated therewith. The system 100 can include an adapter 102 that employs a dynamic contract 106 in order to utilize a portion of metadata associated with an application related to a line of business (LOB) system 104. The adapter 102 can be an adapter developed within an Adapter Framework (not shown) for a particular LOB system 104. The dynamic contract 106 can be incarnated on demand as a consuming client dictates such contract. The adapter 102 can provide real time enterprise application integration in which data can be shared in a secure and orchestrated manner. It is to be appreciated and understood that the adapter 102 can be created by utilizing an Adapter Framework (not shown), wherein the Adapter Framework can be a library akin to a 32-bit programming model. The Adapter Framework can be utilized to write useful adapters (e.g., the adapter 102) for a particular system. The adapter 102 can generate the dynamic contract 106 (e.g., a service contract, a dynamic service contract, a type safe service contract, etc.) that allows metadata to be exposed from the LOB system 104 with a web service specific to a client request and/or selection. In other words, a client can utilize the adapter 102 to evaluate available metadata associated with the LOB system 104, wherein upon selection the adapter 102 can generate the dynamic contract 106 for metadata exposure. It is to be appreciated that the adapter 102 can create "fluid" service contracts that allow metadata to be exposed/provided on-the-fly to whichever client desires such information.

The LOB system 104 can include a portion of metadata related to at least one business application. The business application can be, but is not limited to, a back end application, an existing business application, a line of business (LOB) application (e.g., accounting, supply chain management, resource planning, etc.), a business activity monitoring (BAM) application, etc. It is to be appreciated that the adapter 102 can further communicate with a business network (not shown), wherein the business network can unite separate business applications, LOB systems, etc. into a coherent whole.

For example, conventional techniques require a definition of a service contract prior to creating a web service which makes such application integration techniques with fixed and rigid characteristics as well as having to be predetermined. Yet, several classes of applications can be difficult to predict based on the numerous methods/calls to capture in a single interface. The system 100 enables such methods/calls to be dynamically created with a dynamic contract 106 via the adapter 102, wherein such dynamic contract 106 can expose a portion of metadata associated with an application within the LOB system 104. For instance, the dynamic contract 106 can be layered above an application to be consumed by an integration application. In addition, the system 100 can retain type and provide strong type and type checking (discussed in more detail below). Additionally, a client can utilize the adapter 102 to search, browse, and/or inspect a portion of metadata within the LOB system 104 in order to construct a tailored service contract (e.g., dynamic contract 106).

In addition, the system 100 can include any suitable and/or necessary interface component 106 (herein referred to as "interface 106"), which provides various adapters, connectors, channels, communication paths, etc. to integrate the entity data model 102 into virtually any operating and/or database system(s) and/or with one another. In addition, the interface component 106 can provide various adapters, connectors, channels, communication paths, etc., that provide for interaction with the executor component 102, network service 104, replacement network service 106, and any other device and/or component associated with the system 100.

Figure 2:
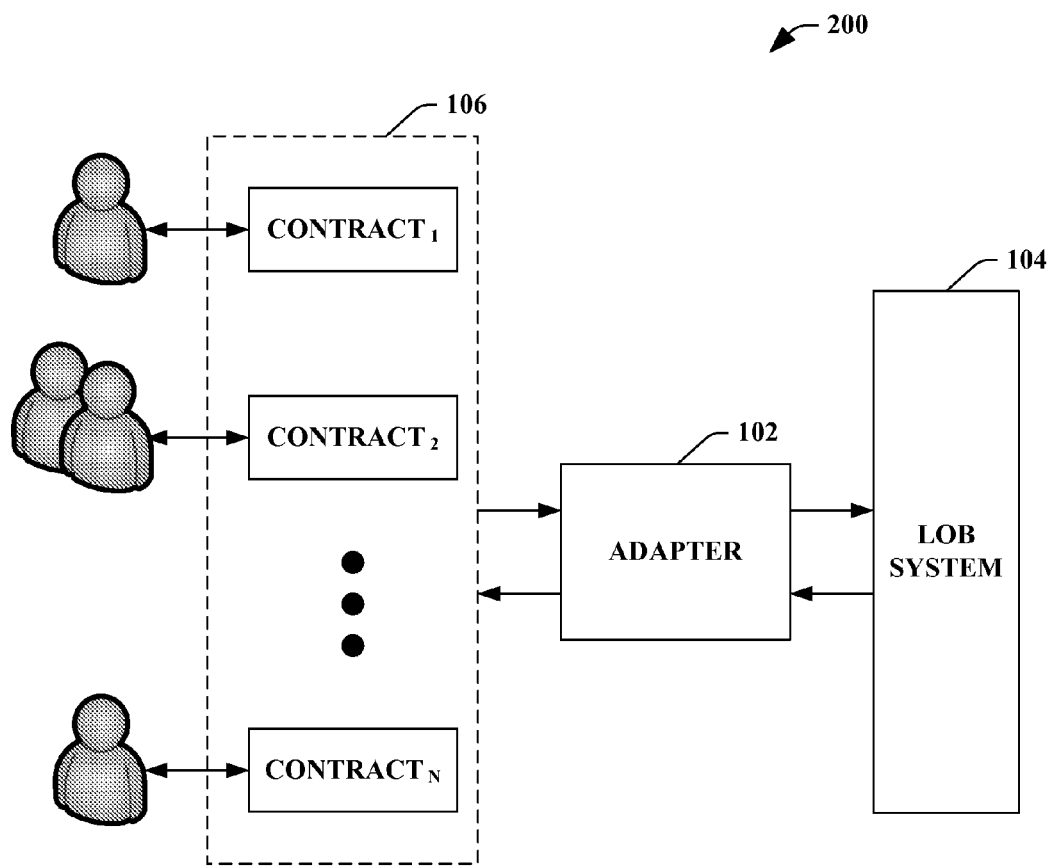
FIG. 2 illustrates a block diagram of an exemplary system that facilitates generating a plurality of dynamic, type safe service contracts specific to numerous clients.

FIG. 2 illustrates a system 200 that facilitates generating a plurality of dynamic, type safe service contracts specific to numerous clients. The system 200 can include the adapter 102 that can be implemented to an Adapter Framework model. The adapter 102 can enable metadata from the LOB system 104 to be exposed with real time, type safe service contracts. Rather than creating a rigid web service with pre-defined service contracts for metadata exposure, the system 200 allows a client to identify metadata within the LOB system 104 in real time (e.g., during design time) in which dynamic service contracts 106 can be created and/or implemented for data exposure and/or access (e.g., during run time).

The adapter 102 can provide non-static and type safe service contracts to the LOB system 104. In particular, a client can search and inspect metadata associated with the LOB system 104 in order to create a custom, dynamic service contract. Moreover, the adapter 102 can enforce strict typing and error checking that is consumer driven. In order to facilitate providing such functionality, the adapter 102 can include an integration adapter that can interface services with the LOB system 104.

The adapter 102 can produce any suitable number of dynamic contracts 106, wherein each contract can correspond to particular client(s). For example, a first client can identify particular portions of metadata to utilize via the adapter 102. Thus, the adapter 102 enables client-specific service contracts to be dynamically created during design time. As depicted, the adapter 102 can create any suitable number of service contracts such as contract $_1$ to contract $_N$, where N is a positive integer.

For example, a client can utilize an API (not shown) and a run time (not shown) associated with the adapter 102 to generate a dynamic service contract 106 in real time during design time. Following such example, the adapter 102 can include a library (not shown) with a plurality of possible APIs and/or services, wherein the client can implement at least one method/call from such library to provide at least one service. With such tools (e.g., library, API, run time, etc.), the client can identify which dynamic service contracts to compose. Moreover, such run time can interface to a communication foundation (e.g., a unified framework to build secure, reliable, transacted, and interoperable distributed applications) to allow the composition of a type safe, dynamic service contract. An adapter written to the adapter 102 or Adapter Framework (not shown) can further manifest as communication foundation bindings which can be invoked via a communication foundation programming model, a service programming model (e.g., via a client proxy generated from a dynamic service contract), etc.

It is to be appreciated that the adapter 102 can be a layer in between the LOB system 104 and the consuming client that allows a client to "carve out and construct" a strongly typed service contract dynamically from the live metadata in the LOB system 104. The adapter 102 can enable the development of adapters which act as an "uber service" that can incarnate a portion of a service from an available backend metadata within the LOB system 104. In general, the system 200 can allow a client to manage with changing functionality within the LOB system 104 without being intimately aware of such changes. Additionally, the adapter 102 provides a more consumer-friendly experience for exposure of LOB systems with large and unwieldy metadata although the metadata may remain more or less static.

Figure 3:
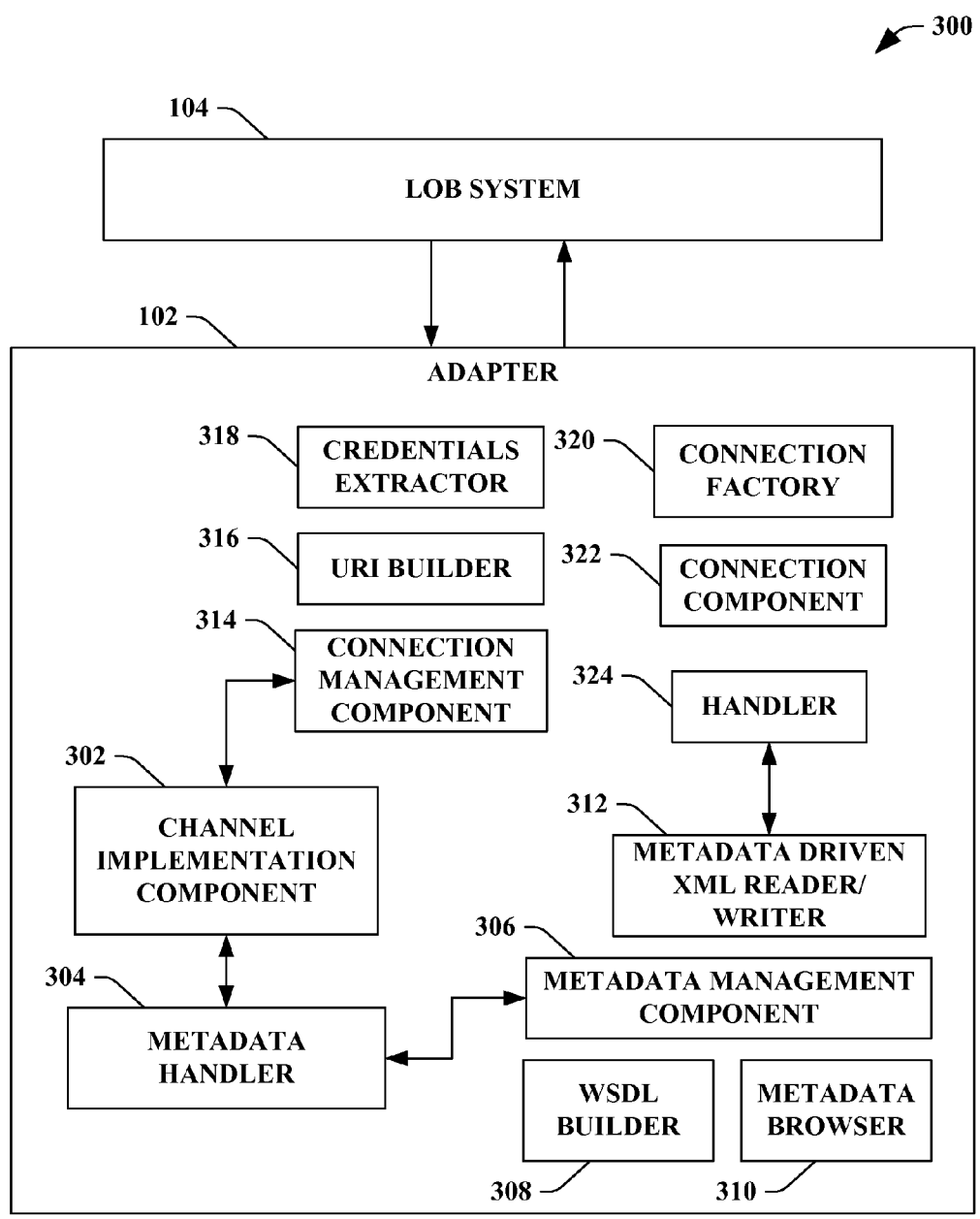
FIG. 3 illustrates a block diagram of an exemplary system that facilitates employing an adapter that enables real time service contracts to access metadata related to a LOB system.

FIG. 3 illustrates a system 300 that facilitates employing an adapter that enables real time service contracts to access metadata related to a LOB system. The system 300 depicts the adapter 102 that provide real time service contract creation with strongly typed and type safe characteristics. The modules included within the adapter 102 can be associated with an Adapter Framework in order to implement the adapter 102. Such dynamic and/or fluid service contracts allow exposure to portions of metadata within the LOB system, wherein such contracts can incarnate, on demand, any customizable contract for a particular client usage scenario. Additionally, a client can identify and/or select a portion of metadata in real time in order to construct a tailored service contract with the adapter 102. For example, the client can search, browse, and inspect metadata on the LOB system 104. Thus, a service contract created with the adapter 102 can be "consumer driven" rather than "producer driven" and yet retain strong typing and strict error checking that is inherent in such "producer defined" service contracts. It is to be appreciated that the adapter 102 can be exposed as a service interacting with the LOB system 104 (e.g., a service layer on top of the LOB system, a service layer utilized by the LOB system, etc.).

The adapter 102 can include a run time (not shown) and a library (not shown). As previously discussed, the library can include a plurality of APIs and/or services in which a client can implement services from such library. The run time can interface with a communication foundation to experience the composition of a type safe dynamic service contract. In addition, the adapter 102 can include various modules (e.g., components, builders, handlers, factories, extractors, browsers, etc.). It is to be appreciated that the adapter 102 can include any suitable number of modules and the depiction in FIG. 3 is solely for illustration purposes. For example, the adapter 102 can implement at least one of the following: a channel implementation component 302; a metadata handler 304; a metadata management component 306; a web service definition language (WSDL) builder 308; a metadata browser 310; a metadata driven extensible markup language (XML) reader/writer 312; a connection management component 314; a uniform resource identifier (URI) builder 316; and/or a credentials extractor 318. Moreover, a developer and/or a client can implement at least one of a connection factory 320, a connection component 322, and/or a handler 324. Generally, the metadata browser 310 allows a client to browse, search, and/or view metadata associated with the LOB system 104. Additionally, the credentials extractor 318 can return credentials associated with a portion of metadata within the LOB system 104. Furthermore, the URI builder 316 can build a uniform resource identifier. It is to be appreciated the other modules are described in more detail below.

The adapter 102 can hook into a plurality of object model calls and retrieve metadata from the LOB system 104 and/or any other suitable backend system (not shown). Moreover, the adapter 102 can describe an object model having such object model calls, wherein the adapter 102 can utilize. The object model can be surfaced to a user and/or client through a user interface (UI) to enable a client and/or user to select specific methods/calls for a service contract. In general, a user and/or client can utilize the adapter 102 to hook into the LOB system 104 in order to retrieve a portion of metadata and/or various methods/calls. With such linkage, the user and/or client can select and/or pick portions of metadata (via service contracts) to compose such contracts (e.g., a contract is a collection of methods/calls and/or ties) during design time.

For illustration purposes, the system 300 can be described in connection with a design time timing diagram 400 in FIG. 4 and a run time timing diagram 500 in FIG. 5. It is to be appreciated that the timing diagram 400 and the timing diagram 500 are just exemplary illustrations in accordance with the subject innovation and are not to be limiting on the claimed subject matter. In general, the timing diagram 400 can enable a consuming client to inspect (e.g., searching, browsing, etc.) the LOB system 104 to identify a service contract to carve out and/or compose. It is to be understood that the adapter 102 with the included library can expose any suitable number of methods/calls within the LOB system 104.

With the adapter 102, a client can customize dynamic service contracts by selecting metadata to expose in real time. Thus, the timing diagram 400 illustrates a client in design time creating a customized contract with the client-selected values (e.g., metadata) of the LOB system 104 and/or application related to the LOB system 104.

During design time, a client can utilize the adapter 102 to create and/or compose a contract that is most relevant to a specific scenario. The adapter 102 can provide extensive tooling support to search, browse, and inspect metadata within the LOB system 104. The adapter 102 provides support for the following: an object model that an adapter developer can write to, to describe operations and parameters of "remote procedure call (RPC) like" legacy systems; support for translating such types to XSD types (e.g., to enable construction of a WSDL to express the service contract); an object model that an adapter developer can leverage to convert XSD types back to LOB types with minimal XML manipulation; and an in memory caching mechanism to improve performance of metadata resolution.

Figure 4:
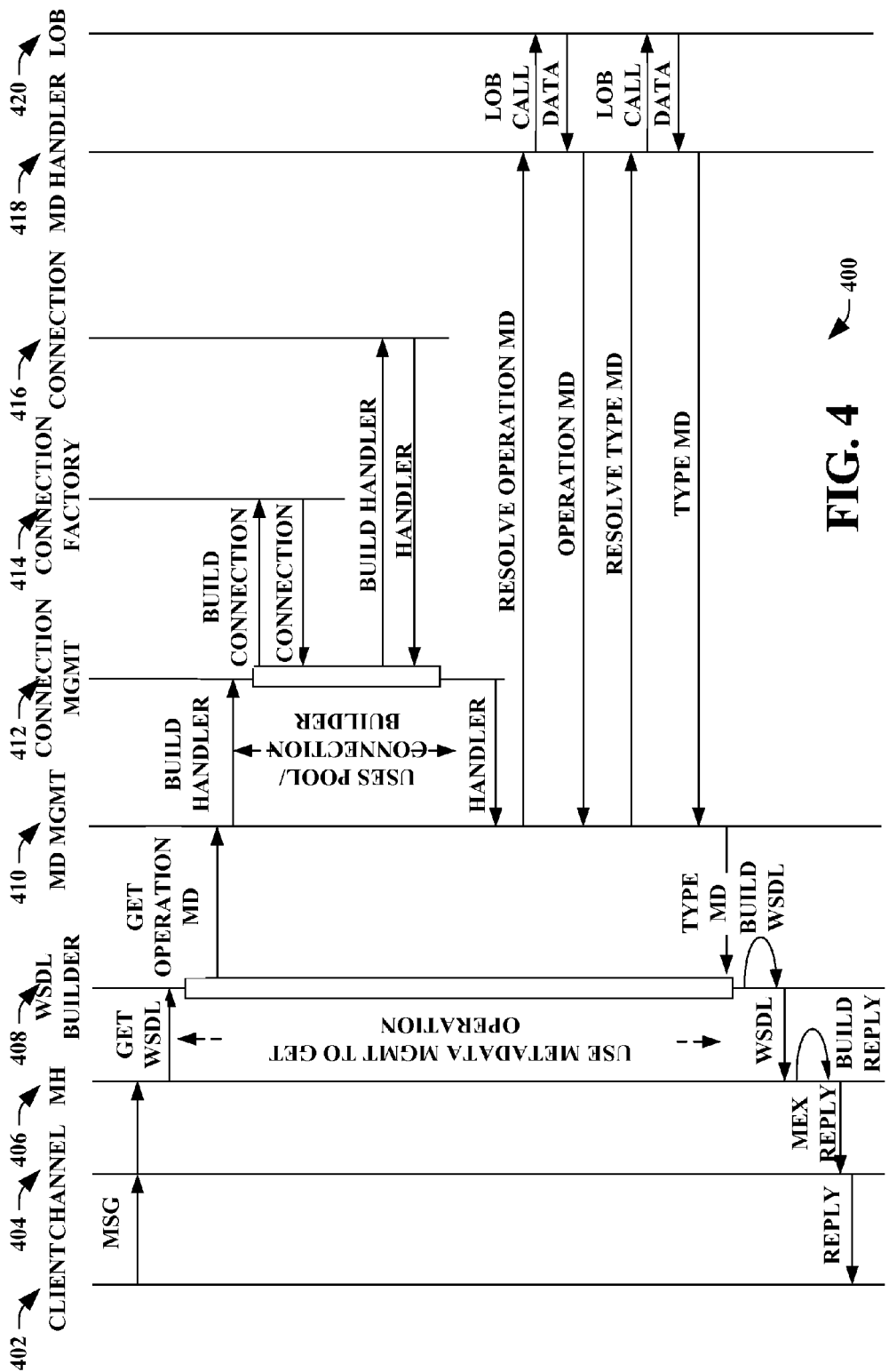
FIG. 4 illustrates a block diagram of an exemplary timing diagram that facilitates composing a dynamic service contract that exposes metadata hosted within a LOB system.

Turning to FIG. 4, the timing diagram 400 is illustrated that facilitates composing a dynamic service contract that exposes metadata hosted within a LOB system. At reference numeral 402, a client can communicate a message (MSG) to the channel implementation component 302 (referred to as channel). At reference numeral 404, the channel implementation component 302 can communicate the message to the metadata handler 304 (referred to as MH). At reference numeral 406, the metadata handler 304 can communicate with the WSDL builder 308 to get a WSDL. It is to be appreciated that the metadata management component 306 can be utilized to get an operation beginning at reference numeral 406. At reference numeral 408, the WSDL builder 308 can get operation metadata (MD) from the metadata management component 306. At reference numeral 410, the metadata management component 306 can build a handler with the connection management component 314. It is to be appreciated that the metadata management component 306 can utilize pool/connection builder beginning at reference numeral 410. At reference numeral 412, the connection management component 314 can build a connection with the connection factory 320. At reference numeral 414, the connection factory 320 can return a connection to the connection management component 314.

Returning to reference numeral 412, the connection management component 314 can build a handler with the connection component 322. At reference numeral 416, the connection component 322 can return a handler (e.g., the handler 324) to the connection management component 314. Returning to reference numeral 410, the metadata management component 306 can receive the handler and can resolve operation MD with the MD handler 304. At reference numeral 418, the MD handler 304 can provide a LOB call/method to the LOB system 104. At reference numeral 420, the LOB system 104 can return the requested data. Returning to reference numeral 418, the MD handler 304 can communicate the operation MD to the metadata management component 306. At reference numeral 410, the metadata management component 306 can resolve the type MD with the MD handler 304, wherein at reference numeral 418 a LOB call/method is communicated to the LOB system 104. At reference numeral 420, the LOB system 104 can provide data to the MD handler 304. At reference numeral 418, the MD handler 304 can communicate type MD to the metadata management component 306. Returning to reference numeral 410, the metadata management component 306 can communicate the type MD to the WSDL builder 308, wherein the WSDL can be built. At reference numeral 408, the WSDL builder 308 can communicate the WSDL to the MD handler 304, wherein a reply can be built. At reference numeral 406, the MD handler 304 can communicate a MEX reply to the channel implementation component 302. At reference numeral 404, the channel implementation component 302 can communicate the reply to the client.

Figure 5:
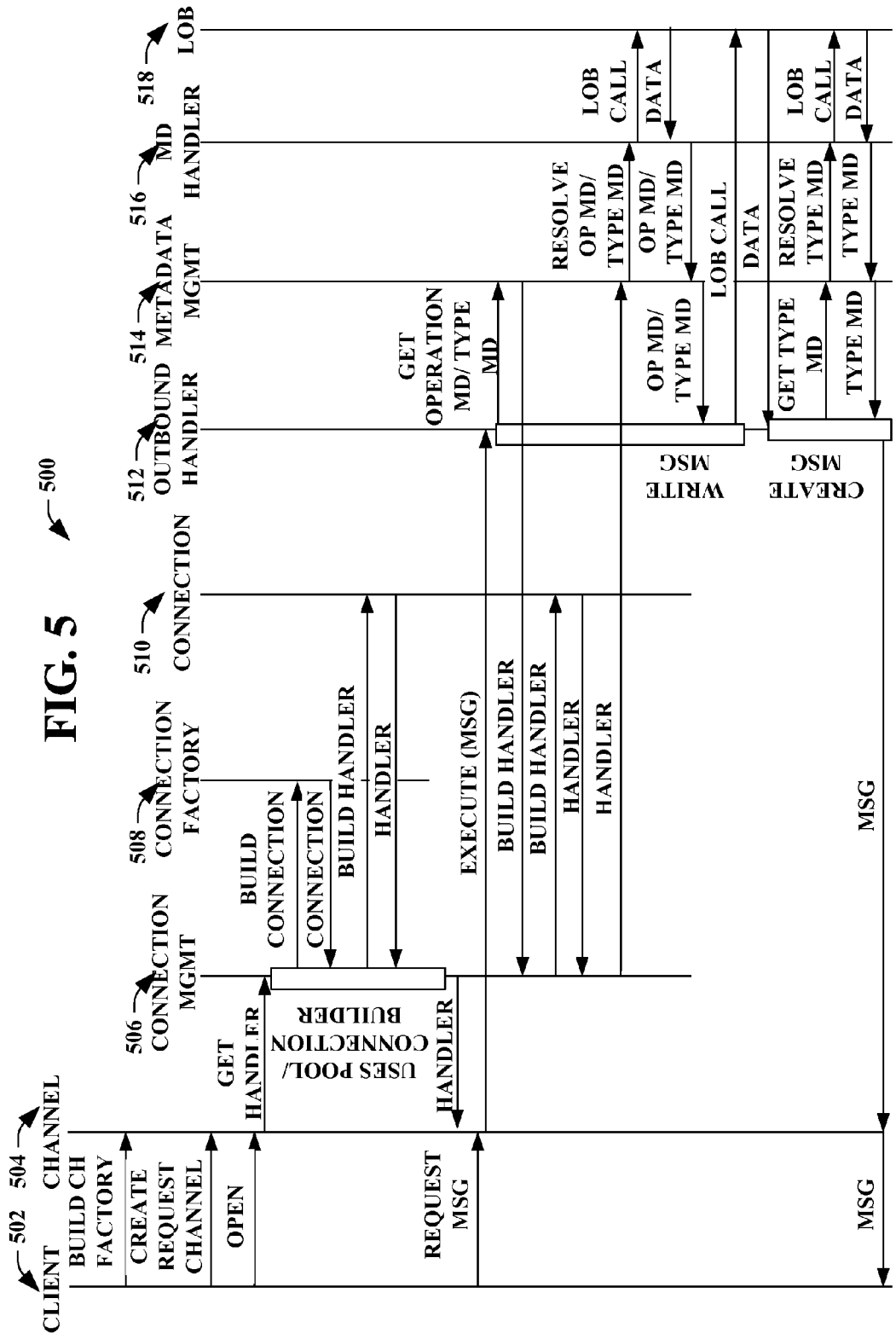
FIG. 5 illustrates a block diagram of exemplary timing diagram that facilitates utilizing a dynamic service contract to access a portion of metadata related to the LOB system.

Turning to FIG. 5, the timing diagram 500 is illustrated that facilities utilizing a dynamic service contract to access a portion of metadata related to the LOB system. In general, during the run time calls/methods can be made into the back-end system (e.g., the LOB system 104) utilizing the contracts created during design time. During the run time, a client can retrieve portions of metadata from the LOB system 104 with the calls/methods that are identified/selected to ensure that there is actually a call/method for the service contract. In other words, during the run time, the adapter 102 can collect metadata with associated parameters and utilize that information to invoke a particular call to the LOB system 104. This is what provides the strong typing and dynamic error checking that was referenced earlier.

At reference numeral 502, a client can build the channel factory 320 with the channel implementation component 302. Moreover, the client can create a request channel and open such request with the channel implementation component 302. At reference numeral 504, the channel implementation component 302 can get the handler (e.g., handler 324) with the connection management component 314. It is to be appreciated that the channel implementation component 302 can use pool/connection builder. At reference numeral 506, the connection management component 314 can build connection with the connection factory 320. At reference numeral 508, the connection factory 320 can return a connection to the connection management component 314. Returning to reference numeral 506, the connection management component 314 can build a handler (e.g., the handler 324) with the connection component 322. At reference numeral 510, the connection component 322 can return the handler to the connection management component 314. At reference numeral 506, the connection management component 314 can return the handler to the channel implementation component 302.

At reference numeral 502, the client can communicate a request message to the channel implementation component 302. At reference numeral 504, the channel implementation component 302 can execute the message to an outbound handler. At reference numeral 512, get operation MD and/or type MD can be requested to the metadata management component 306. It is to be appreciated that the message can be written by the metadata driven XML reader/writer 312 with the outbound handler at reference numeral 512. At reference numeral 514, the metadata management component 306 can build handler and communicate such handler to the connection management component 314. At reference numeral 506, the connection management component 314 can request to build the handler with the connection component 322, wherein the connection component 322 can return the handler to the connection management component 314 at reference numeral 510. At reference numeral 506, the connection management component 314 can communicate the handler to the metadata management component 306.

At reference numeral 514, the metadata management component 306 can resolve operation MD and/or type MD with the MD handler 304. At reference numeral 516, the MD handler 304 can communicate a LOB call and/or method to the LOB system 104. At reference numeral 518, the LOB system 104 can communicate data to the MD handler 304. At reference numeral 516, the MD handler 304 can communicate the operation MD and/or type MD to the metadata management component 306. At reference numeral 514, the metadata management component 306 can communicate the operation MD and/or type MD to the outbound handler via the metadata driven XML reader/writer 312. At reference numeral 512, the outbound handler can communicate a LOB call and/or method to the LOB system 104. At reference numeral 518, the LOB system 104 can communicate data to the outbound handler. It is to be appreciated that the message can be created by the metadata driven XML read/writer 312 at reference numeral 512. Continuing at reference numeral 512, the outbound handler request get type MD to the metadata management component 306, wherein the metadata management component 306 can request a resolve type MD to the MD handler 304 at reference numeral 514. At reference numeral 516, the MD handler 304 can communicate a LOB call to the LOB system 104. At reference numeral 518, the LOB system 104 can communicate data to the MD handler 304. At reference numeral 516, the MD handler 304 can return type MD to the metadata management component 314, wherein the metadata management component 314 can communicate type MD to the outbound handler at reference numeral 512. At reference numeral 512, the outbound handler can communicate the message to the channel implementation component 302. At reference numeral 504, the channel implementation component 302 can communicate the message to the client.

Figure 6:
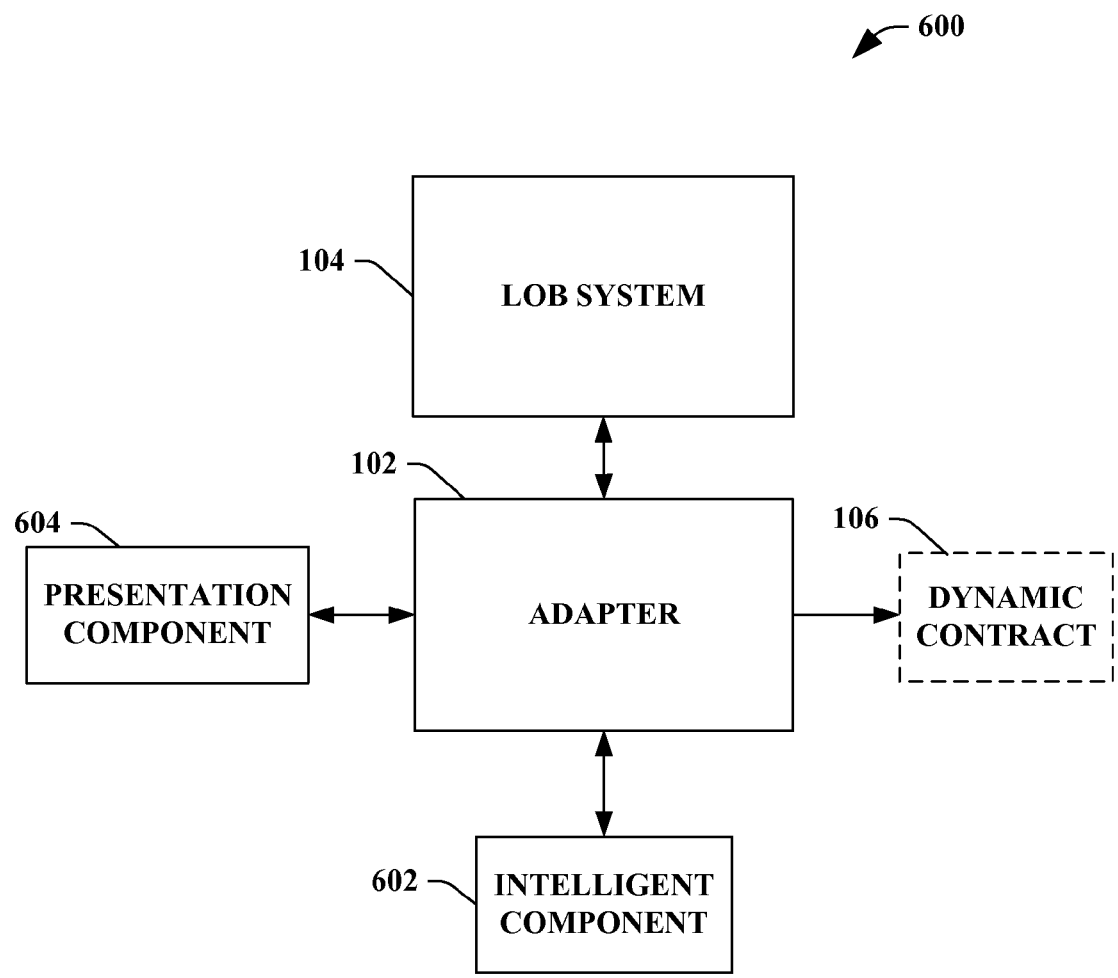
FIG. 6 illustrates a block diagram of an exemplary system that facilitates creating a dynamic service contract related to a line of business system and/or metadata associated therewith.

FIG. 6 illustrates a system 600 that employs intelligence to facilitate creating a dynamic service contract related to a line of business system and/or metadata associated therewith. The system 600 can include the adapter 102, the LOB system 104, and the dynamic service contract 106. It is to be appreciated that the adapter 102, the LOB system 104, and the dynamic service contract 106 can be substantially similar to respective components, systems, and contracts described in previous figures. The system 600 further includes an intelligent component 602. The intelligent component 602 can be utilized by the adapter 102 to facilitate utilizing dynamic service contracts to expose a portion of metadata related to the LOB system 104. For example, the intelligent component 602 can infer user preferences, metadata desired by a client, optimal service contracts based on client preferences, available metadata, portions of metadata to expose, contract length, contract ownership, etc. In addition, the system 600 can include policy-based filtering of LOB metadata to surface contracts that honor such policies (e.g., security policy that might restrict non-managers from viewing review data of employees, etc.). Thus, a contract generator can automatically filter out non-available metadata smartly or intelligently.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The adapter 102 can further utilize a presentation component 604 that provides various types of user interfaces to facilitate interaction between a user and any component coupled to the adapter 102. As depicted, the presentation component 604 is a separate entity that can be utilized with the adapter 102. However, it is to be appreciated that the presentation component 604 and/or similar view components can be incorporated into the adapter 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the adapter 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
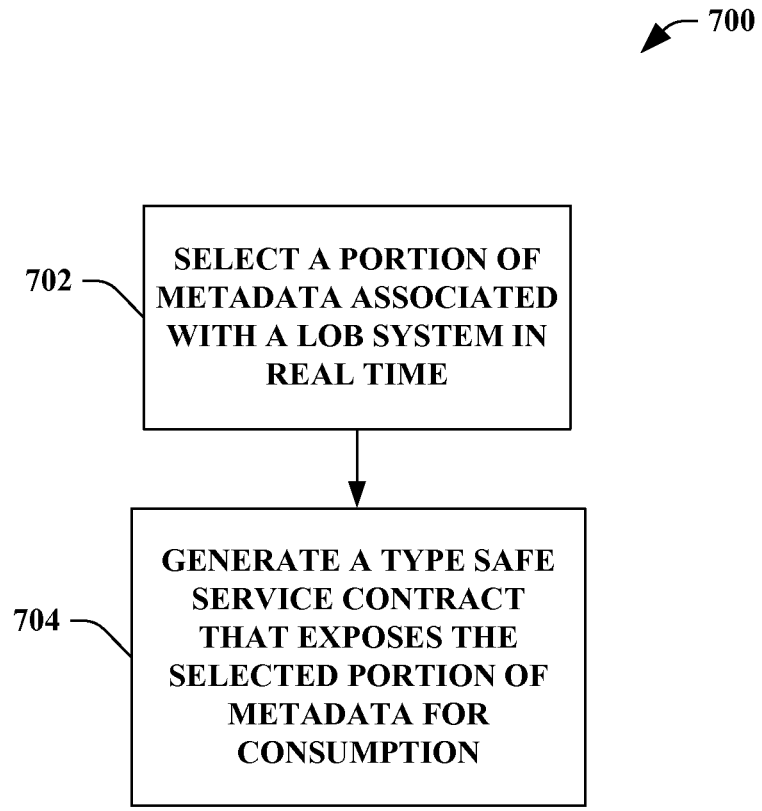
FIG. 7 illustrates an exemplary methodology for creating a dynamic service contract related to a line of business system and/or metadata associated therewith.
Figure 8:
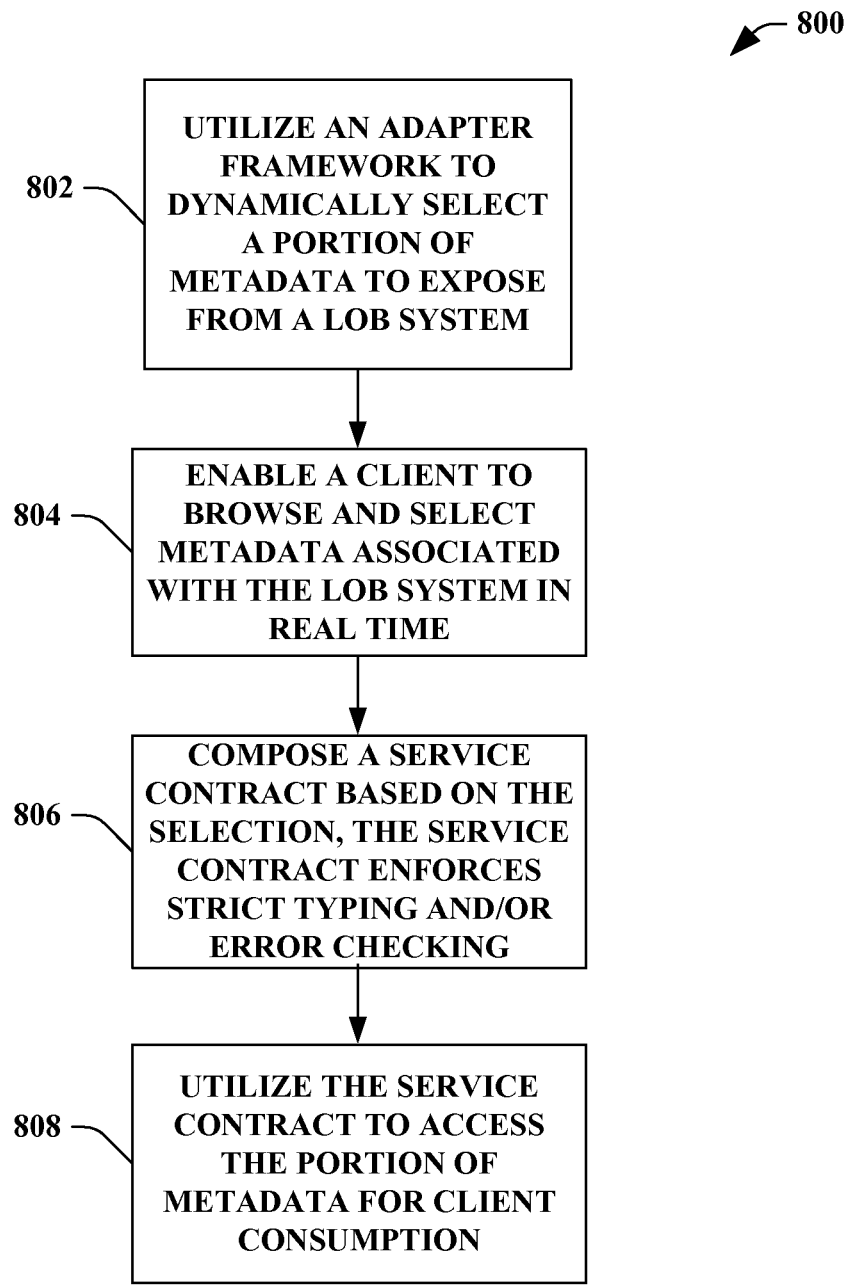
FIG. 8 illustrates an exemplary methodology that facilitates generating a plurality of dynamic, type safe service contracts specific to numerous clients.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates creating a dynamic service contract related to a line of business system and/or metadata associated therewith. At reference numeral 702, a portion of metadata associated with a LOB system can be selected in real time. For example, the portion of metadata can be selected by a user, a client, a machine, an application, a device, etc. The LOB system can include a portion of metadata related to at least one business application. The business application can be, but is not limited to, a back end application, an existing business application, a line of business (LOB) application (e.g., accounting, supply chain management, resource planning, etc.), a business activity monitoring (BAM) application, etc.

At reference numeral 704, a type safe service contract can be generated, wherein the service contract can expose the selected portion of metadata for consumption. In one example, the consumption can be the utilization by a client, a machine, a disparate application, a network, etc. In general, it is to be appreciated that the service contract can be dynamically created in order to access and/or expose a portion of metadata from the LOB system. Thus, the service contract can be non-static and type safe.

FIG. 8 illustrates a method 800 for generating a plurality of dynamic, type safe service contracts specific to numerous clients. At reference numeral 802, an adapter framework can be utilized to dynamically select a portion of metadata to expose from a LOB system. At reference numeral 804, a client can be enabled to browse and select a portion of metadata associated with the LOB system in real time. At reference numeral 806, a service contract can be composed based on the selection, wherein the service contract can enforce strict typing and/or error checking. At reference numeral 808, the service contract can be utilized to access the portion of metadata for client consumption.

Figure 9:
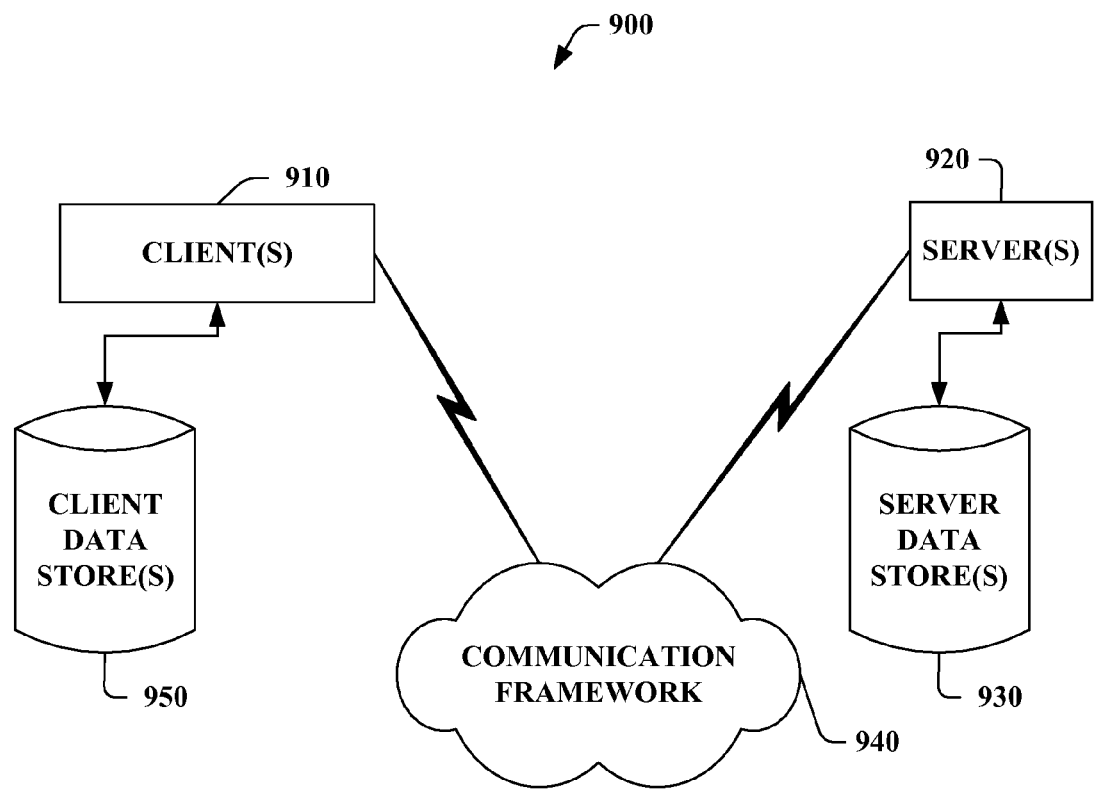
FIG. 9 illustrates an exemplary networking environment, wherein the novel aspects of the claimed subject matter can be employed.
Figure 10:
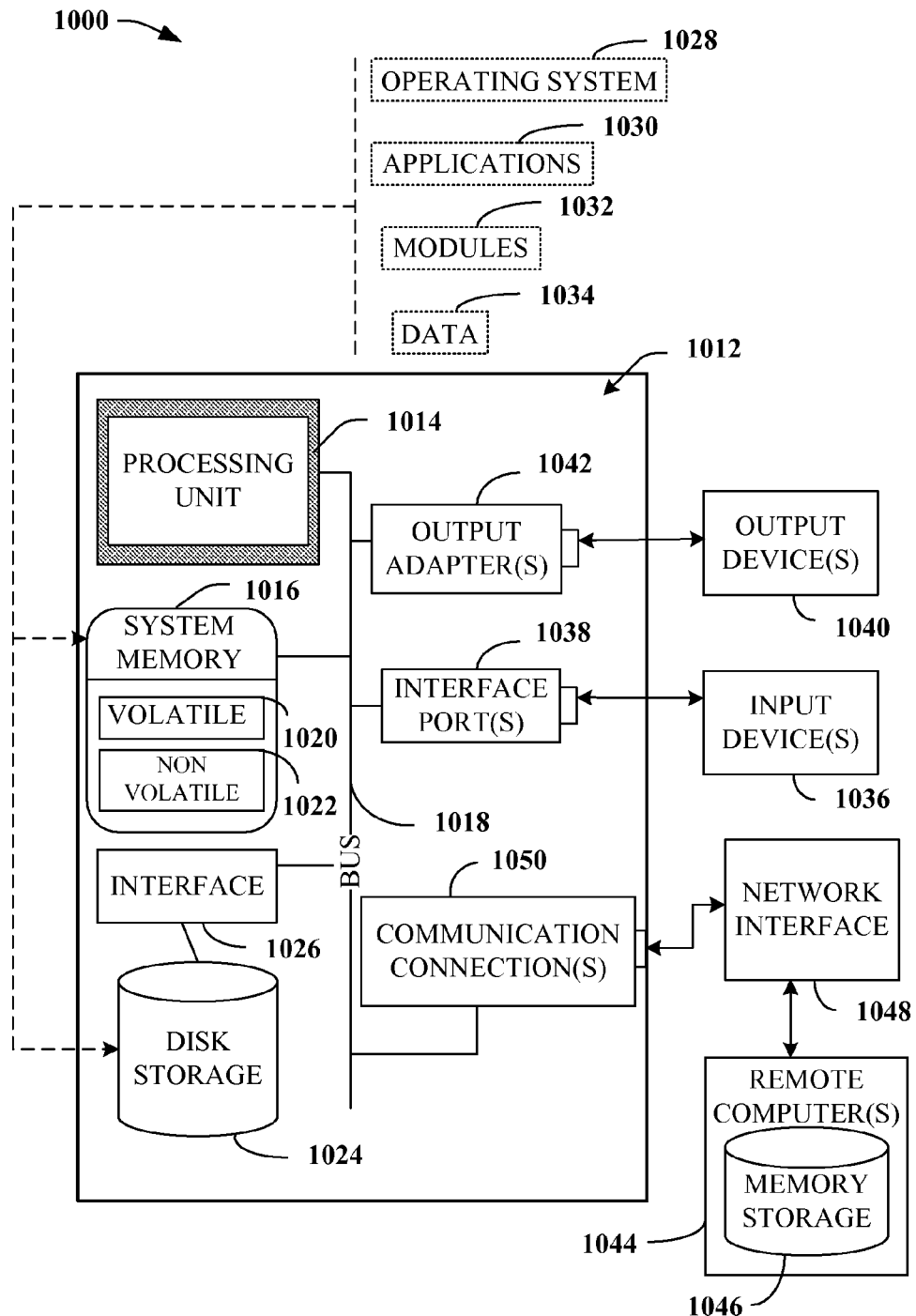
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an adapter that facilitates application integration associated with line of business (LOB) systems and consuming clients, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system comprising at least one processor coupled to at least one computer-readable storage medium storing instructions executable by the at least one processor to implement:
    a line of business (LOB) system including metadata associated with a business application; and
    an adapter configured to
        enable inspecting of the metadata by providing a call to the LOB system;
        enable real-time viewing and selecting of the metadata,
        generate, in real time, a service contract for a web service based on the selecting of the metadata, and
        access the selected metadata via the generated service contract.

2. The system of claim 1, wherein the business application includes at least one of a back end application, an existing business application, a line of business (LOB) application, an accounting application, a supply chain management application, a resource planning application, or a business activity monitoring (BAM) application.

3. The system of claim 1, further comprising an adapter framework configured to support implementation of the adapter.

4. The system of claim 1, wherein the service contract defines one or more available methods of the web service.

5. The system of claim 1, wherein the adapter is configured to link to the LOB system during a design time to retrieve the metadata.

6. The system of claim 1, wherein the adapter is configured to enforce error checking.

7. The system of claim 1, further comprising a presentation component configured to provide a graphical user interface.

8. The system of claim 1, further comprising a filter component configured to automatically filter out metadata based on a security policy that restricts viewing of data.

9. The system of claim 1, wherein the adapter is configured to associate the service contract with functionality for invocation via a service programming model.

10. The system of claim 1, wherein the adapter is configured to link to an object model call to retrieve the metadata from the LOB system.

11. The system of claim 9, wherein the service programming model is configured to be implemented by a client proxy generated by the service contract.

12. The system of claim 10, wherein the adapter is configured to describe an object model including the object model call.

13. The system of claim 1, wherein the adapter includes an object model configured to support conversion of data types.

14. The system of claim 1, wherein the adapter is configured to support construction of a web service definition language to express the service contract.

15. The system of claim 1, the adapter comprising a metadata management component configured to resolve a type associated with the metadata.

16. The system of claim 1, wherein the adapter is configured to create a plurality of service contracts, each for a particular client.

17. A computer-implemented method comprising using at least one processor coupled to at least one computer-readable storage medium storing instructions executable by the at least one processor to perform operations comprising:
    using the at least one processor, inspecting of metadata associated with at least one of a line of business system or a business application by providing a call to the at least one of a line of business system or a business application;
    receiving a selection of metadata associated with the at least one of a line of business system or a business application;
    using the at least one processor, creating, in real-time, a web service contract corresponding to the selection of metadata; and
    implementing the web service contract to access the metadata.

18. The method of claim 17, further comprising enabling browsing and selecting of the metadata in real time.

19. The method of claim 17, further comprising enforcing error checking with the web service contract.

20. A computer-readable storage memory storing instructions, the instructions if executed by a computing device causing the computing device to perform operations comprising:
    via an adapter, inspecting of metadata by providing a call to an LOB system;
    by the adapter, providing the metadata;
    via the adapter, receiving inputs associated with at least one of searching or browsing metadata associated with the LOB system;
    by the adapter, creating a web service contract based on metadata selected through the at least one of searching or browsing; and
    accessing the selected metadata via the created web service contract.

* * * * *